United States Patent
Kimura

(10) Patent No.: US 7,266,060 B2
(45) Date of Patent: Sep. 4, 2007

(54) OPTICAL DISK APPARATUS AND A SLIDING DRIVE MECHANISM FOR AN OPTICAL PICKUP THEREOF

(75) Inventor: Kuniyuki Kimura, Fujisawa (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 497 days.

(21) Appl. No.: 10/932,205

(22) Filed: Aug. 31, 2004

(65) Prior Publication Data

US 2005/0207302 A1    Sep. 22, 2005

(30) Foreign Application Priority Data

Mar. 16, 2004  (JP) .............................. 2004-073939

(51) Int. Cl.
*G11B 7/00* (2006.01)

(52) U.S. Cl. .................................... 369/44.32; 720/675

(58) Field of Classification Search ............. 369/44.32, 369/53.19; 720/674
See application file for complete search history.

(56) References Cited

U.S. PATENT DOCUMENTS

| | | | |
|---|---|---|---|
| 5,995,479 A * | 11/1999 | Takizawa et al. ........... | 720/675 |
| 6,373,812 B2 * | 4/2002 | Kim et al. ................... | 720/675 |
| 6,567,362 B1 * | 5/2003 | Kagaya et al. .............. | 720/675 |
| 6,636,473 B1 * | 10/2003 | Kagaya et al. .............. | 720/683 |
| 6,654,326 B1 * | 11/2003 | Park et al. ................ | 369/53.19 |
| 6,744,716 B1 * | 6/2004 | Takemoto ................ | 369/53.19 |
| 6,813,773 B2 * | 11/2004 | Liao et al. ................... | 720/675 |
| 6,901,599 B2 * | 5/2005 | Nagatsuka ................... | 720/675 |

FOREIGN PATENT DOCUMENTS

| | | |
|---|---|---|
| JP | 11-039661 | 2/1999 |
| JP | 2003-217155 | 7/2003 |
| KR | 2004-11644 | 11/2004 |

* cited by examiner

*Primary Examiner*—Thang V. Tran
(74) *Attorney, Agent, or Firm*—Townsend and Townsend and Crew LLP

(57) ABSTRACT

In an optical disk apparatus applicable to super thin-sizing thereof, and further a sliding drive mechanism for an optical pickup, having a tilt adjustment mechanism, being suitable to such the optical disk apparatus, the sliding drive mechanism for an optical pickup slides the optical pickup 330 in the radial direction of an optical disk, wherein the optical pickup is attached to be movable on a pair of main and counter sliding shafts 331 and 332, being disposed in parallel with, and in neighboring to the main sliding shaft is disposed a lead screw 336, which is rotationally driven by a stepping motor 337, in parallel, while being engaged with a rack 335 formed in a part of the optical pickup. Also, an end of the main sliding shaft, both ends of the counter sliding shaft, and an end of the lead screw are disposed and fixed onto a chassis being formed in one body therewith, and further the other end of the main sliding shaft and the other end of the lead screw are positioned, in one body thereof, by means of a connection member 341, while the connection member is adjustable on the position thereof by means of an adjusting screw 342 to the chassis, thereby building up a tilt adjusting mechanism for the optical pickup.

8 Claims, 4 Drawing Sheets

OPTICAL DISK APPARATUS AND A SLIDING DRIVE MECHANISM FOR AN OPTICAL PICKUP THEREOF

BACKGROUND OF THE INVENTION

The present invention relates to an optical disk apparatus, for recording or reproducing recording information through irradiating a light beam upon an information-recording medium, such as, being so-called a discoidal optical disk, and it relates to, in particular, an optical disk apparatus having a tilt adjustment mechanism for an optical pickup thereof, as well as, a sliding drive mechanism for an optical pickup having such the tilt adjustment mechanism therein.

In recent years, the optical disk apparatus, for recording or reproducing recording information through irradiating a light beam upon an information-recording medium, such as, being so-called a discoidal optical disk, accompanying with wide spreading of the information recording media, enabling recording/reproducing of a large amount of information, such as a CD-ROM and/or a DVD disk, etc., it is used widely, not only as an AV apparatus for recording/reproducing music and/or pictures, but also, as an apparatus of enabling to record/reproduce such the information media; i.e., as an exterior memory of a personal computer or the like.

On the other hand, in recent years, accompanying with small-sizing and low-pricing of such the personal computers and so on, but including the AV apparatus mentioned above therein, demand is made thereupon, strongly, also upon the optical disk apparatus, to be small in the sizes and low in the price thereof. However, in relation to the small-sizing of the optical disk apparatus, since the optical disks, being the information recording media to be used therein, such as, the CD-ROM and/or the DVD disk, etc., for example, are already determined in the sized thereof at the predetermined values, in accordance with a standard or the like thereof; therefore, it is strongly required that the apparatus itself comes to be thin in the type or size thereof, and accompanying with this, in most recent years, an optical disk apparatus appears on the market, which is so-called a super-thin type, being equal or less than 10 mm in the thickness size thereof.

By the way, for an optical pickup provided within such the optical disk apparatus, so as to satisfy such the strong demand made for thin-sizing mentioned above, it is necessary to be movable, freely and swiftly, in the radial direction of the optical disk inserted within the apparatus, but also within a very narrow space defined therein, and further, it is also necessary to conduct a focusing operation; i.e., focusing a laser beam irradiated upon the information recording surface of the disk.

Conventionally, in the structure for mounting the optical pickup on such the optical disk apparatus mentioned above, as is already known in the following Patent Document 1, for example, the optical pickup is hooked on a pair of rod-like shafts (i.e., a sliding main-shaft and a counter-shaft) at both ends thereof, and it is further attached with a lead screw provided in parallel with the sliding shaft, engaging on a portion thereof; thereby achieving the movement through rotating the lead screw by means of a disk motor, i.e., being made of a stepping motor or the like, for example.

And, in such the structure, conventionally, the adjustment mechanism for the tilt, i.e., an inclination angle of the optical pickup, is achieved by making adjustment only upon the inclination of the sliding main-shaft and the counter-shaft of the optical pickup. However, as a result of bringing the optical characteristics of the optical pickup to be optimal through the adjustment of that sliding main-shaft, there is caused an anxiety that a relative distance and/or an angle defined between the lead screw and the sliding main-shaft comes out from being constant, within an inside of the disk (i.e., a side near to the disk motor) and an outside thereof (i.e., a side far from the disk motor). In such the case, the lead screw may come out from the engagement with a rack therebetween; thus, there may be caused so-called jump-out from the screw. Further, since the strict restriction is made also upon the lead screw, in particular, in the depth of grooves (or, the teeth height of a screw), accompanying with the thin-sizing of the optical disk apparatus, then this also comes up to be a remarkable problem, in particular, in the optical disk apparatus, in particular, of such the super thin-type mentioned above.

However, with such the structure already known in that Patent Document 1, due to the tilt adjustment conducted when manufacturing the optical disk apparatus, the counter-shaft is attached on a substrate portion (i.e., a main chassis) through an adjustment mechanism portion thereof, while disposing a supporting portion of the sliding main-shaft and the stepping motor, on which the lead screw is attached, on a sub-substrate, thereby achieving a tilt adjustment through conducting an adjustment on that sub-substrate, in relation to the substrate portion (i.e., the main chassis).

Patent Document 1: Japanese Patent Laying-Open No. Hei 11-39661 (1999).

SUMMARY OF THE INVENTION

As was mentioned above, the optical disk apparatus is remarkable, in particular, of the thin-sizing thereof, in the recent years, and accompanying with this, it is necessary to achieve the thin-sizing, not only for the optical pickup of itself, but also on the diameter of lead screw to be thin, and further it is necessary for the tilt adjustment mechanism to achieve the thin-sizing thereof.

Namely, according to the present invention, being achieved for dissolving such the problems mentioned above, an object thereof is to provide the structure of an optical pickup, being applicable for thinning the diameter of the lead screw and/or thin-sizing of the tilt adjusting mechanism, also with application of such the optical pickup therein, to provide an optical disk apparatus to be applicable to such the super thin-sizing as was mentioned above, and further to provide a sliding drive mechanism for an optical pickup having a tilt adjustment mechanism, being suitable to such the optical disk apparatus.

For accomplishing the object mentioned above, according to the present invention, first of all, there is provided an optical disk apparatus, for reading out record information from an optical disk, comprising: an optical pickup for generating a light beam to be irradiated upon a recording surface of said optical disk, and for receiving a reflection light upon said disk, being attached to be movable in a radial direction of said optical disk, on a pair of sliding shafts disposed in parallel with each other; and a disk motor for rotating said optical disk therewith, further having: a tilt adjustment mechanism for adjusting tilting of said optical pickup, including: a lead screw, being disposed in parallel with a one of said pair of sliding shafts, in vicinity thereof, so that said lead screw is engaged with a rack, which is formed in a part of said optical pickup; a rotary driving means for rotationally driving said lead screw; a chassis formed in one body with one end of said one sliding shaft, both ends of other one of said pair of sliding shafts, and also an end of said lead screw and said driving means thereof; and a connecting member for positioning the other end of said one sliding shaft and the other end of said lead screw in one body thereof, wherein said connecting member is adjustable in position thereof with respect to said chassis.

Also, according to the present invention, in the optical disk apparatus as described in the above, it is preferable that said connecting member is adjustable in position thereof, in a direction perpendicular to the recording surface of said optical disk, or that said optical disk is equal to 10 mm or less than that in size of thickness thereof.

Further, according to the present invention, for accomplishing the object mentioned above, too, there is also provided a sliding drive mechanism for driving an optical pickup, through sliding said optical pickup in radial direction of an optical disk, in an optical disk apparatus, comprising: a pair of sliding shafts disposed in parallel with each other, for attaching said optical pickup thereon to be movable in a radial direction of said optical disk; and a tilt adjustment mechanism for adjusting tilting of said optical pickup, including: a lead screw, being disposed in parallel with a one of said pair of sliding shafts, in vicinity thereof, so that said lead screw is engaged with a rack, which is formed in a part of said optical pickup; a rotary driving means for rotationally driving said lead screw; a chassis formed in one body with one end of said one sliding shaft, both ends of other one of said pair of sliding shafts, and also an end of said lead screw and said driving means thereof; and a connecting member for positioning the other end of said one sliding shaft and the other end of said lead screw in one body thereof, wherein said connecting member is adjustable in position thereof with respect to said chassis.

Also, according to the present invention, in the sliding drive mechanism for an optical pickup as described in the above, it is preferable that said connecting member is adjustable in position thereof, in a direction perpendicular to the recording surface of said optical disk, or that said lead screw has an outer diameter from $\phi$ 1.8 to 2.2 mm, and further an outer periphery thereof is formed with a groove from 0.25 to 0.45 mm in depth thereof.

Namely, according to the optical disk apparatus and the sliding drive mechanism for an optical pickup thereof, according to the present invention, it is possible to provide the structure for the optical pickup, being applicable for achieving thin-sizing of the diameter of the lead screw and/or thin-sizing of the tilt adjusting mechanism, also with application of such the optical pickup, to provide an optical disk apparatus to be applicable to such the super thin-sizing mentioned above, and further to provide a sliding drive mechanism for an optical pickup having a tilt adjustment mechanism, being suitable to such the optical disk apparatus.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Figure 2:
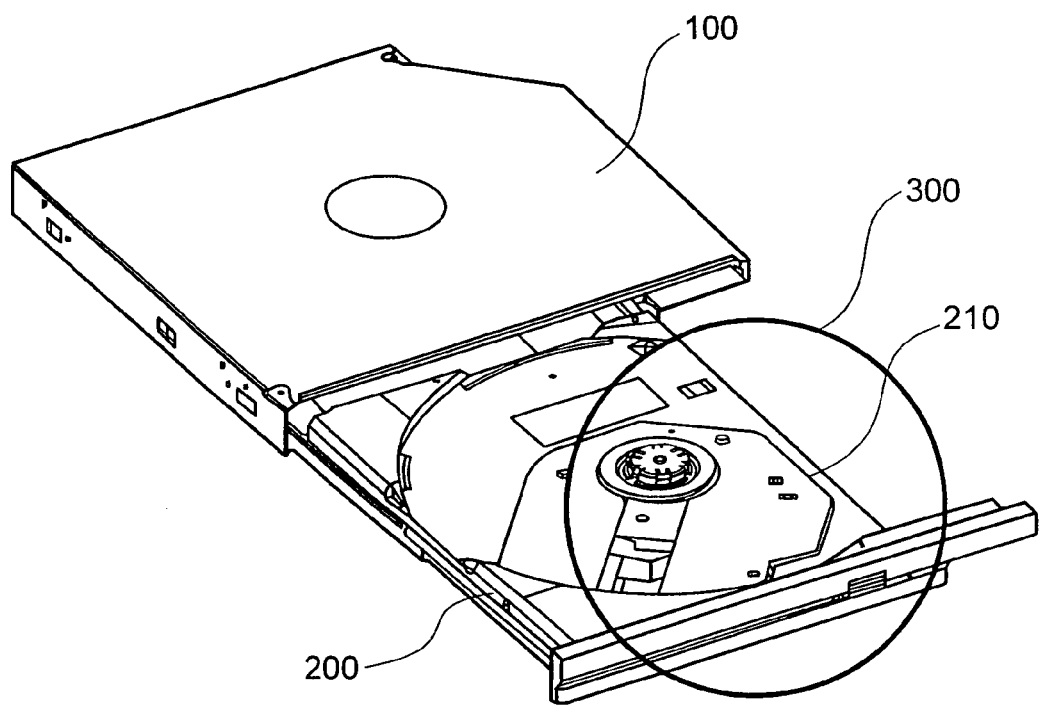
FIG. 2 is a perspective view, for showing an outlook structure of the optical disk apparatus, according to one embodiment of the present invention.

Firstly, FIG. 2 attached herewith shows the outlook structure of an optical disk apparatus, according to one embodiment of the present invention. Namely, the optical disk apparatus according to the present embodiment is so-called the super thin-type optical disk apparatus, having the thickness being equal to 10 mm or less than that (however, the lower limit thereof is about 9 mm, for example) in the size thereof, and within an inside of this thin box-type housing 100 is provided so-called a plate-like tray 200 in a dischargable/insert able manner, for mounting thereon an information recoding medium, such as, being so-called the optical disk, but not shown in the figure.

Figure 1:
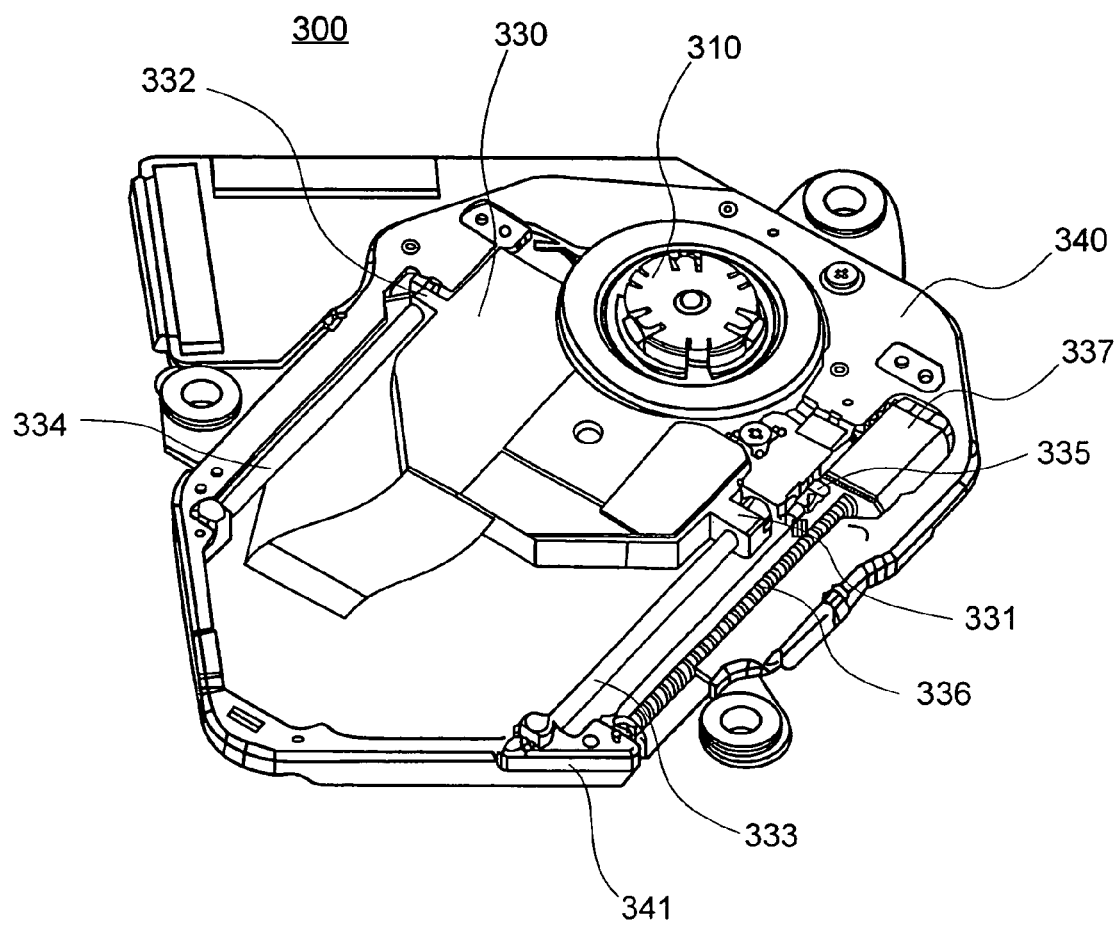
FIG. 1 is a perspective view, for showing the entire structure of an optical pickup portion, which is installed into an optical disk apparatus, in a slidable manner, according to one embodiment of the present invention.

Next, FIG. 1 attached herewith shows the entire structure of an optical pickup portion 300, which is attached on a portion of the tray 200 of the optical disk apparatus mentioned above. And, this optical pickup portion is built up with, as apparent from the figure, such as, a stepping motor, for example, in a part thereof, and it is also equipped with a rotating drive portion for driving the optical disk, rotationally, which is mounted on a discoidal turn table 310 attached onto a rotation shaft thereof. Also, though not shown in the figure herein, however; in this optical pickup portion are disposed a light beam generator means, such as, of a semiconductor laser or the like, an optical system for irradiating the light beam from the light beam generator means upon the information recording surface of the optical disk, as well as, for condensing the reflection light thereof, including therein, such as, an objective lens, etc., for example, and further the so-called optical pickup, in which a light receiving element or the like is disposed, to receive the reflection light from the optical disk, thereby for detecting the intensity or strength thereof, and this optical pickup 330 is attached therein, so that it can move (or slide) the position thereof, freely, in the radial direction of the optical disk, which is mounted on the turn table 310, with an aid of the function of a sliding drive mechanism, the details of which will be mentioned later.

Namely, as is apparent from the figure, this optical pickup 330 has projecting portions 331 and 332, each being formed with a penetrating hole therein, at both ends in the direction perpendicular to that, in which the optical pickup can move (or slide) (i.e., the radial direction of the optical disk), and it is attached with, while inserting a pair of sliding shafts (i.e., a sliding main-shaft 333 and a sliding counter-shaft 334) into the inside of the penetrating holes thereof. Further, those sliding shafts 333 and 334 are disposed to be nearly in parallel with each other, in the radial direction of the optical disk. In addition thereto, on one side of the both ends of the optical pickup 330 (i.e., on the left-hand side end in the figure), there is further attached a rack portion 335, and at the position opposing to this rack portion 335 is disposed a lead screw 336, being engaged with it, in parallel with the sliding main-shaft 333.

Further, as is apparent from the figure, this lead screw 336 is attached onto a rotating shaft of a driving means, such as, being made of the stepping motor 337, for example, as an unit or in one body therewith. And, those sliding main-shaft 333, the sliding counter-shaft 334 and the lead screw 336, as well as, the stepping motor (or, the disk motor) 337 as being the driving means thereof, build up so-called, a sliding drive mechanism for the optical pickup, and they are attached, directly, onto the so-called chassis portion 340, which is made of aluminum, etc., in one body and has a shape of being about rectangular ("□") in the outer configuration thereof, thereby to be fixed thereon, and in particular, the tip portions (i.e., the lower end portions thereof in the figure) of the sliding main-shaft 333 and the lead screw 336 are fixed onto a connection member 341 for building up the tilt adjustment mechanism therewith.

Figure 3:
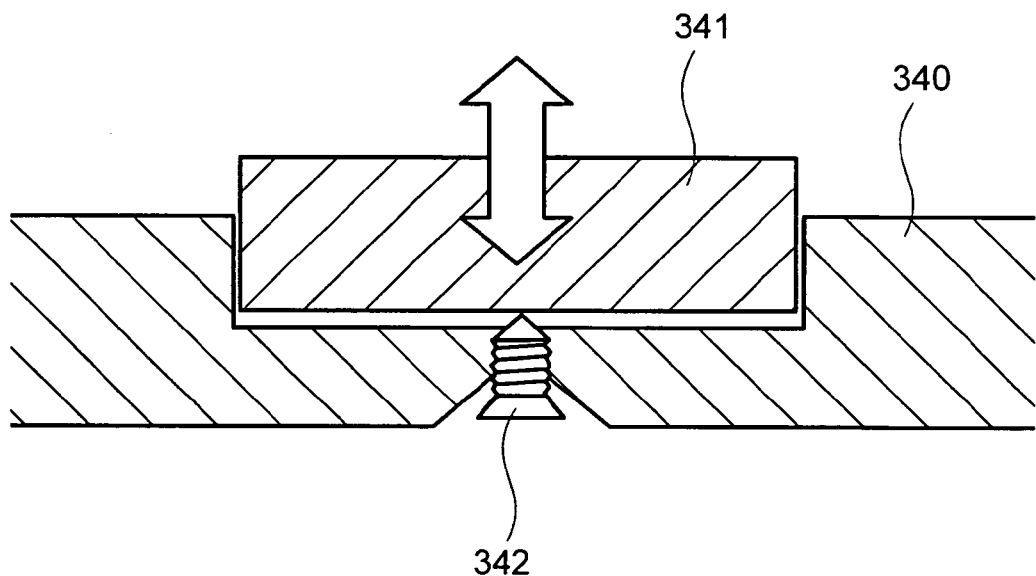
FIG. 3 is an enlarged partial cross-section view, for explaining an example of a tilt adjustment mechanism, within a sliding drive mechanism for the optical pickup portion mentioned above.

Moreover, as is shown in FIG. 3 attached, for example, this connection member 341 is fixed at the position thereof, on an outer periphery side of the chassis 340 (i.e., the lower side in the figure), by means of an adjusting screw 342, and it is adjustable in the direction of an arrow (i.e., up/down in the direction) in the figure, by the function of this adjustment screw 342. In this manner, in the sliding mechanism of the optical pickup 330 mentioned above, the tip portions of the sliding main-shaft 333 and the lead screw 336 (i.e., the lower end portions in the figure) are fixed on the connection member 341, and further, in accordance with such the structure that the connection member 341 is adjustable in the vertical direction (i.e., up or down), the optical pickup 330 can be adjusted in the tilting, under the condition of keeping the optimal relationship between the lead screw 336, which is attached onto the output shaft of the disk motor 337, and the sliding main-shaft 333. Namely, with such the structure as was mentioned above, it is possible to maintain accuracy of positioning the sliding main-shaft 333 to be attached onto the disk motor 337, with certainty, under the optimal condition; therefore, it is possible to bring the performance to be preferable or suitable, in particular, of reading out the optical disk by means of the optical pickup 330 mentioned above.

With such the features as was mentioned above, in particular, even with the lead screw 336, which is severally restricted upon the outer diameter thereof, as well as, the depth of grooves (i.e., the teeth height of the screw) that are formed on the outer periphery thereof, accompanying with the thin-sizing of the optical disk apparatus, as was mentioned above, however the lead screw will not come out from the engagement or meshing between the rack 335 attached on the optical pickup 330; thereby, it is possible to prevent the lead screw from resulting into the so-called jump-out from the engagement or meshing therebetween. Thus, in particular, within the so-called super thin-type optical disk apparatus, which is reduced in the size of thickness, such as, to be equal to 10 mm or less than that, this lead screw 336 has an outer diameter, being nearly equal to φ 2.0±0.2 mm, and further, the depth of grooves formed on the outer periphery thereof (the teeth height of the screw) is about 0.35±0.1 mm; i.e., being very small and fine. For this reason, even if it comes out a little bit, in the distance and/or the angle between the sliding main-shaft 333, the lead screw will comes out easily from the engagement with the rack; i.e., having the structure of easily causing the jump-out of the screw. However, though not showing in the figure, the positioning of the screw in the radial direction of the disk (i.e., in the plane direction) is provided within the chassis 340, and also that on the inner periphery side thereof is fixed on the chassis.

However, with such the structure as was mentioned above; i.e., the lead screw 336 and the sliding main-shaft 333 being adjustable, in the form of the one body thereof and at the same time, but it is possible to achieve an adjustment on tilting of the optical pickup, in such the case as was mentioned above, easily, but without resulting into such the jump-out from the rack, with certainty.

Figure 4:
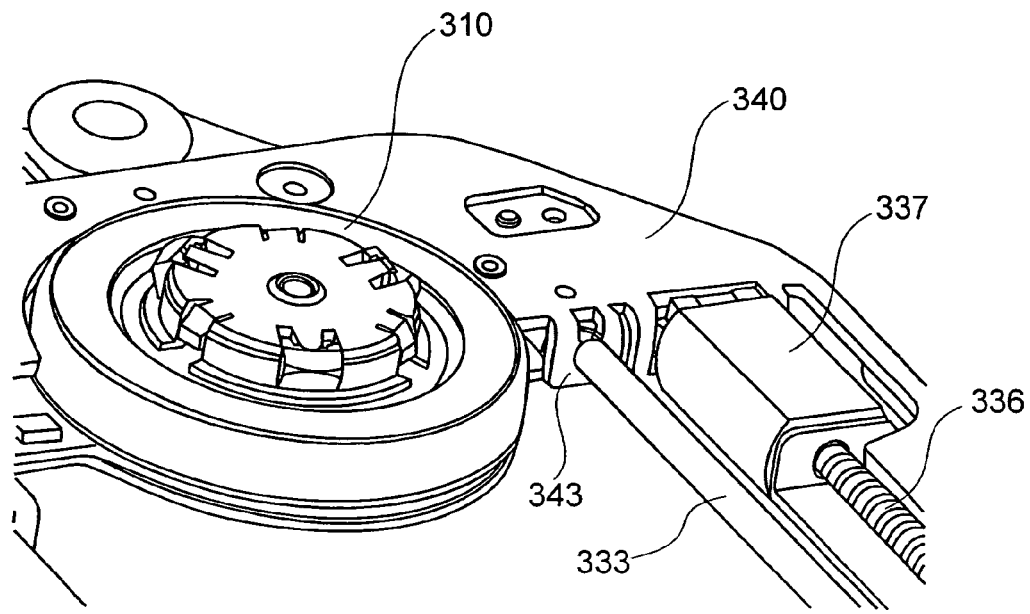
FIG. 4 is an enlarged partial cross-section view, for showing an attachment structure for a sliding main-shaft of the tilt adjustment mechanism, in the sliding drive mechanism for the optical pickup portion mentioned above.
Figure 5:
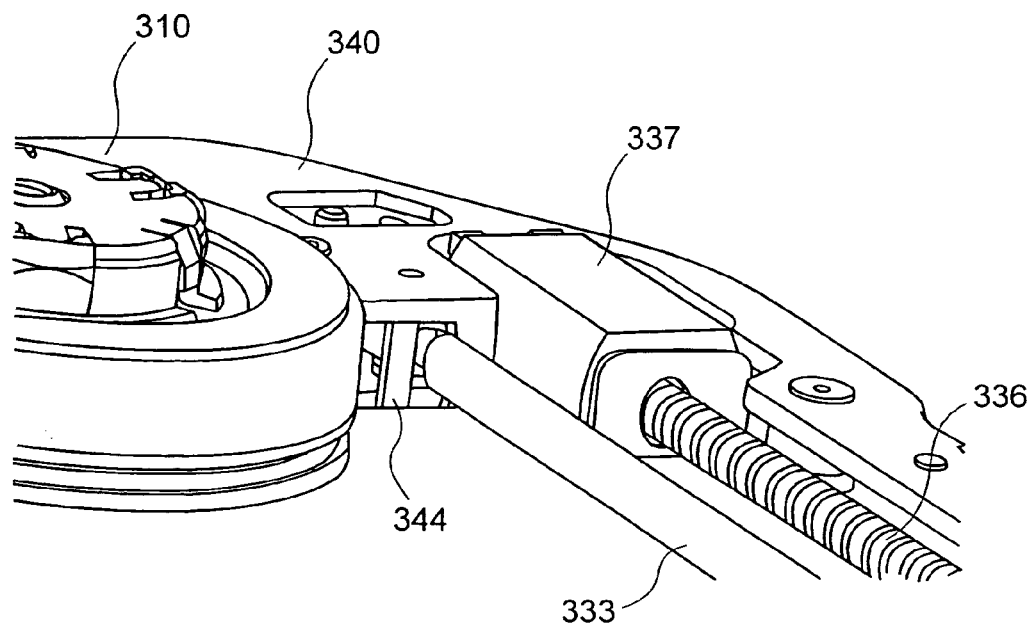
FIG. 5 is an enlarged partial cross-section view, for showing other attachment structure for the sliding main-shaft of the tilt adjustment mechanism, within the sliding drive mechanism for the optical pickup portion mentioned above.

Next, FIG. 4 attached herewith shows an example of the structure, in which the sliding main-shaft 333 is attached on the chassis 340. However, in the structure shown in this FIG. 4, a penetrating hole is formed in advance, in a portion 343 of the chassis 340, on a part of which is attached the disk motor 337, and this portion is folded back, so that an end of the sliding main-shaft 333 is inserted into this penetrating hole, to be fixed thereto. Or alternately, as is shown in FIG. 5 attached herewith, also a part 344 of the chassis 340 is folded back, so as to insert the end of the sliding main-shaft 333 therein for fixing; however, a portion 342 of the chassis 340 is extended and folded back, along a side wall of the disk motor 337 mentioned above, thereby enabling to maintain the disk motor 337 with respect to the position of the motor center (i.e., the disk center), being preferable much more in the accuracy thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk apparatus, for reading out record information from an optical disk, comprising:

an optical pickup for generating a light beam to be irradiated upon a recording surface of said optical disk, and for receiving a reflection light upon said disk, being attached to be movable in a radial direction of said optical disk, on a pair of sliding shafts disposed in parallel with each other; and a disk motor for rotating said optical disk therewith, further having:

a tilt adjustment mechanism for adjusting tilting of said optical pickup, including:

a lead screw, being disposed in parallel with a one of said pair of sliding shafts, in vicinity thereof, so that said lead screw is engaged with a rack, which is formed in a part of said optical pickup;

a rotary driving means for rotationally driving said lead screw;

a chassis formed in one body with one end of said one sliding shaft, both ends of other one of said pair of sliding shafts, and also an end of said lead screw and said driving means thereof; and a connecting member for positioning the other end of said one sliding shaft and the other end of said lead screw in one body thereof, wherein said connecting member is adjustable in position thereof with respect to said chassis.

2. The optical disk apparatus, as described in the claim 1, wherein said connecting member is adjustable in position thereof, in a direction perpendicular to the recording surface of said optical disk.

3. The optical disk apparatus, as described in the claim 1, wherein said optical disk is about 10 mm in size of thickness thereof.

4. The optical disk apparatus, as described in the claim 2, wherein said optical disk is about 10 mm in size of thickness thereof.

5. A sliding drive mechanism for driving an optical pickup, through sliding said optical pickup in radial direction of an optical disk, in an optical disk apparatus, comprising:

a pair of sliding shafts disposed in parallel with each other, for attaching said optical pickup thereon to be movable in a radial direction of said optical disk; and a tilt adjustment mechanism for adjusting tilting of said optical pickup, including:

a lead screw, being disposed in parallel with a one of said pair of sliding shafts, in vicinity thereof, so that said lead screw is engaged with a rack, which is formed in a part of said optical pickup;

a rotary driving means for rotationally driving said lead screw;

a chassis formed in one body with one end of said one sliding shaft, both ends of other one of said pair of sliding shafts, and also an end of said lead screw and said driving means thereof; and a connecting member for positioning the other end of said one sliding shaft and the other end of said lead screw in one body thereof, wherein said connecting member is adjustable in position thereof with respect to said chassis.

6. The sliding drive mechanism for an optical pickup, as described in the claim 5, wherein said connecting member is adjustable in position thereof, in a direction perpendicular to the recording surface of said optical disk.

7. The sliding drive mechanism for an optical pickup, as described in the claim 5, wherein said lead screw has an outer diameter from $\phi$ 1.8 to 2.2 mm, and further an outer periphery thereof is formed with a groove from 0.25 to 0.45 mm in depth thereof.

8. The sliding drive mechanism for an optical pickup, as described in the claim 6, wherein said lead screw has an outer diameter from $\phi$ 1.8 to 2.2 mm, and further an outer periphery thereof is formed with a groove from 0.25 to 0.45 mm in depth thereof.

* * * * *